UNITED STATES PATENT OFFICE.

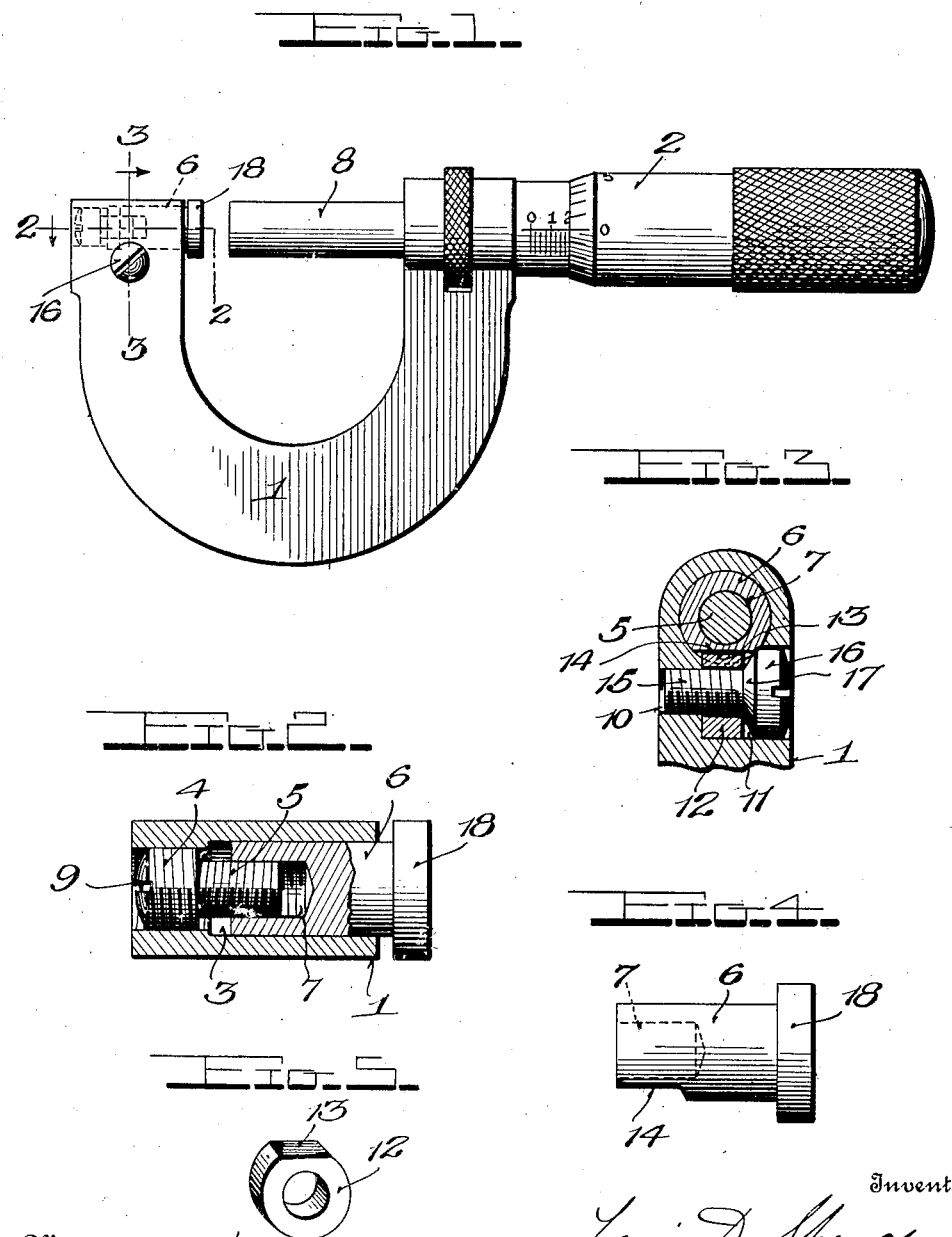

LEWIS D. SPENCE, OF EAST PROVIDENCE, RHODE ISLAND, ASSIGNOR TO BROWN & SHARPE MANUFACTURING COMPANY, OF PROVIDENCE, RHODE ISLAND, A CORPORATION OF RHODE ISLAND.

CALIPER.

1,337,165.      Specification of Letters Patent.      Patented Apr. 13, 1920.

Application filed March 1, 1919. Serial No. 280,045.

*To all whom it may concern:*

Be it known that I, LEWIS D. SPENCE, a citizen of the United States, residing at East Providence, in the county of Providence and State of Rhode Island, have invented a new and useful Improvement in Calipers, of which the following is a specification.

This invention relates to certain new and useful improvements in a caliper and it has for its primary object and aim to provide an adjustable mounting for the anvil spindle by which the setting of the spindle may be very efficient and easily accomplished.

In the micrometer type of caliper the active face of the anvil spindle is subject to wear and owing to this wear the precision and accuracy of the instrument cannot be relied upon after long usage thereof. With the embodiment of the present invention in a micrometer caliper the spindle may readily be set, *i. e.* its active face advanced to compensate for any wear, and the spindle then securely locked so that the accuracy of the instrument is restored to its original degree.

The invention therefore further resides in the specific features of construction and mounting of the spindle and its locking means, as hereinafter described in detail and claimed in a succinct manner reference being made to the drawings wherein—

Figure 1 is a side elevation of a micrometer caliper embodying the present improvements.

Fig. 2 is a horizontal section lengthwise through the spindle bearing, the view being taken on line 2—2 of Fig. 1.

Fig. 3 is a transverse section on line 3—3 of Fig. 1 depicting more clearly the spindle locking means.

Fig. 4 is a detail elevation of the improved spindle and

Fig. 5 is a perspective view of the guiding washer incorporated in the spindle locking construction.

The form of caliper here depicted comprises a U-frame 1 having the micrometer adjustment 2 mounted on one leg terminal and its opposite leg terminal bored to form a bearing 3, the diameter of the outer end portion of which is reduced to receive, through threaded engagement, an adjusting screw 4 that has a reduced threaded stem or screw 5 extending into the bearing 3. The spindle 6 is provided in its inner end with an axial bore 7 in which the screw 5 is threaded whereby on turning the screw 4 the spindle will be advanced or retracted relative to the micrometer adjustment spindle 8, and in this connection it will be noted that the threads of the screw 5 are reverse or opposite to those of the adjusting screw so that upon turning in the screw the spindle will also be drawn inwardly and vice versa. The turning or operation of the screw is facilitated by means of the diametrical groove 9 to receive a screw driver or other tool, and since the screw is well within the lines of the frame there is little likelihood of the same being inadvertently disturbed.

A screw threaded opening 10 extends transversely of the leg of the frame from one side face thereof and from the opposite side this opening is counterbored to provide a washer-receiving chamber 11 that is located below the bearing 3 although it has communication therewith as shown in Fig. 3. A washer 12 is diposed in the bottom or inner end of this chamber and the upper peripheral portion of this washer is flattened along a chordal line, as indicated at 13. This flattened face 13 fits against a similarly formed face 14 provided on the lower peripheral portion of the otherwise cylindrical spindle 6 and thereby holds the latter from turning with the screw 5 while at the same time permits the spindle to slide lengthwise in the bearing.

A screw 15 loosely passes through the guiding washer and engages in the threaded opening 10, the head 16 of the screw retaining the washer in the chamber. The under portion of the screw head is formed with a bevel face 17 for engaging on the periphery of the spindle, as indicated in Fig. 3, to thereby firmly lock the spindle against longitudinal movement in its bearing.

The outer end of the spindle is enlarged to form a bearing face 18 which, after long usage, becomes worn and the instrument inaccurate. Therefore, to restore the accuracy of the instrument, the micrometer adjustment is set at zero and the lock screw 15 turned to release the spindle subsequent to which the adjusting screw 5 is rotated to advance the active face 18 against the spindle 8. The lock screw is then tightened to lock the spindle in its bearing. The instrument may now be used in the ordinary manner with precision in its measurements and when wear again occurs the foregoing adjustment is repeated.

Having thus described my invention, what I claim as new and desire to secure by Letters Patent is—

1. In a caliper, a U-frame having a bearing formed in the end of one leg, said bearing being a bore reduced in diameter and threaded at one end, said leg also having a chamber communicating with the bore, and provided with a threaded opening, a spindle slidable in the bore in the bearing and provided with a threaded bore in one end, an adjusting screw engaged in the reduced threaded end of the first mentioned bore and provided with a screw extension engaged in the bore of the spindle, the spindle having a flat face registering with the chamber, a spindle guiding washer disposed within the chamber and likewise formed with a flat face opposing the flat face on the spindle to hold the spindle from turning in its bearing, and a lock screw loosely supporting the washer and engaged in the threaded opening in the chamber, the head of the lock screw jamming against the spindle to secure the same in a set position.

2. In a caliper, a frame formed with a spindle bearing, a spindle slidable therein and provided with a flat face, said frame also formed with a chamber communicating with and having its axis extending transversely of the spindle bearing, a washer like member arranged within the chamber and provided with a flat peripheral face slidably engaging the spindle face, and means for holding the member in the chamber.

3. In a caliper, a frame having a spindle bearing, a spindle slidable therein, removable means for holding the spindle against turning in its bearing, and a single means for securing the first means in position and directly engageable with the spindle for locking the same against sliding in the bearing.

4. In a caliper having a spindle bearing, a spindle in the bearing formed with a lengthwise peripheral flat face, a washer-like member arranged with its axis transverse of the spindle and also having a flattened peripheral face coacting with the spindle face to hold both the spindle and member against turning and means for securing the member to the bearing, said means being directly engageable with the periphery of the spindle beyond its flattened face for securing the spindle to the bearing.

5. In a caliper, a frame having a spindle bearing and a chamber extending transversely of and communicating at one side with the bearing, a spindle adjustable axially in the bearing and formed with a peripheral depression, means arranged in the chamber and coöperating with the spindle depression to guide the spindle axially of the bearing and against rotation therein, and means extending through the first means for securing the same within the chamber and having direct engagement with the spindle for securing the latter in an adjusted position.

6. In a caliper, a frame having a spindle bearing and a communicating chamber, a spindle slidable in the bearing, means arranged within the chamber to guide the spindle axially and against rotary movement in its bearing, and a locking screw extending through the chamber for securing the aforesaid means in the chamber and formed with a beveled head adapted to be jammed against the spindle to hold it fixed relative to its bearing.

7. In a caliper, a frame formed with a spindle bearing, a spindle slidable therein and provided with a flat face, said frame also formed with a chamber communicating with the spindle bearing, a washer like member arranged within the chamber and provided with a flat peripheral face slidably engaging the spindle face, and a single means for locking the spindle fixed and for holding the member in the chamber, said means having direct engagement with both the spindle and the member.

In testimony whereof I have signed my name to this specification in the presence of two subscribing witnesses.

LEWIS D. SPENCE.

Witnesses:
ADA E. HAGERTY,
J. A. MILLER.